United States Patent
Kinugawa et al.

(10) Patent No.: US 9,428,189 B2
(45) Date of Patent: Aug. 30, 2016

(54) VEHICLE RUNNING CONTROL APPARATUS AND PROGRAM THEREFOR

(71) Applicant: DENSO CORPORATION, Kariya, Aichi-pref. (JP)

(72) Inventors: Takaomi Kinugawa, Kariya (JP); Toyohito Nozawa, Aichi-ken (JP); Jin Kurumisawa, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/539,141

(22) Filed: Nov. 12, 2014

(65) Prior Publication Data

US 2015/0134225 A1     May 14, 2015

(30) Foreign Application Priority Data

Nov. 14, 2013    (JP) ................................. 2013-235880

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *B60W 30/16* | (2012.01) |
| *B60W 30/14* | (2006.01) |

(52) U.S. Cl.
CPC ............ *B60W 30/16* (2013.01); *B60W 30/143* (2013.01)

(58) Field of Classification Search
CPC ............................ B60W 30/143; B60W 30/16
USPC ......................................................... 701/96
See application file for complete search history.

(56) References Cited

U.S. PATENT DOCUMENTS

2009/0248270 A1   10/2009   Sekiguchi

FOREIGN PATENT DOCUMENTS

| JP | 3132430 | 2/2001 |
|---|---|---|
| JP | 2002-019486 | 1/2002 |
| JP | 2002-178787 A | 6/2002 |
| JP | 2003-267085 | 9/2003 |
| JP | 2003267085 | * 9/2003 |
| JP | 2009-227256 | 10/2009 |

OTHER PUBLICATIONS

Office Action dated Sep. 29, 2015 in corresponding Japanese Application No. 2013-23580 with English translation.

* cited by examiner

*Primary Examiner* — Maceeh Anwari
(74) *Attorney, Agent, or Firm* — Harness, Dickey & Pierce, P.L.C.

(57) ABSTRACT

A vehicle running control apparatus includes a following distance control unit for maintaining a following distance between an own vehicle on which the vehicle running control apparatus is mounted and a preceding vehicle, an accelerating unit for accelerating the own vehicle at a set acceleration so that a speed of the own vehicle reaches a set speed when the preceding vehicle is lost, and an acceleration suppressing unit configured to suppress acceleration of the own vehicle by the accelerating unit on condition that the preceding vehicle and the own vehicle are under an acceleration suppression condition that an allowance time to collision is smaller than a predetermine lower limit at a moment of loss of the preceding vehicle.

9 Claims, 4 Drawing Sheets

VEHICLE RUNNING CONTROL APPARATUS AND PROGRAM THEREFOR

This application claims priority to Japanese Patent Application No. 2013-235880 filed on Nov. 14, 2013, the entire contents of which are hereby incorporated by reference.

BACKGROUND OF THE INVENTION

1. Field of the Invention

The present invention relates to a vehicle running control apparatus and a program therefor.

2. Description of Related Art

There is known a vehicle running control apparatus configured to run an own vehicle maintaining a set following distance to a preceding vehicle while the preceding vehicle is being detected, and accelerate the own vehicle at a set acceleration after the preceding vehicle is not detected any more due to changing lanes of the preceding vehicle (normal disappearance) or becoming incapable of detecting the preceding vehicle although the preceding vehicle is still present (abnormal disappearance or lost).

Japanese Patent No. 3132430 describes such a vehicle running control apparatus. The vehicle running control apparatus described in this patent document is configured to suppress acceleration of an own vehicle after a preceding vehicle is lost until the own vehicle reaches the position at which the preceding vehicle was lost for safety purpose.

However, according to the vehicle running control apparatus described in the above patent document, even if the preceding vehicle is lost at a position far from the own vehicle, and accordingly it is not necessary to suppress acceleration of the own vehicle, the own vehicle is suppressed from being accelerated without exception.

SUMMARY

An exemplary embodiment provides a vehicle running control apparatus including:

a following distance control unit for maintaining a following distance between an own vehicle on which the vehicle running control apparatus is mounted and a preceding vehicle;

an accelerating unit for accelerating the own vehicle at a set acceleration so that a speed of the own vehicle reaches a set speed when the preceding vehicle is lost; and an acceleration suppressing unit configured to suppress acceleration of the own vehicle by the accelerating unit on condition that the preceding vehicle and the own vehicle are under an acceleration suppression condition that an allowance time to collision is smaller than a predetermined lower limit at a moment of loss of the preceding vehicle.

According to the exemplary embodiment, there is provided a vehicle running control apparatus capable of appropriately determining whether acceleration of an own vehicle should be suppressed or not after a preceding vehicle has been lost, and a program therefor.

Other advantages and features of the invention will become apparent from the following description including the drawings and claims.

PREFERRED EMBODIMENTS OF THE INVENTION

Figure 1:
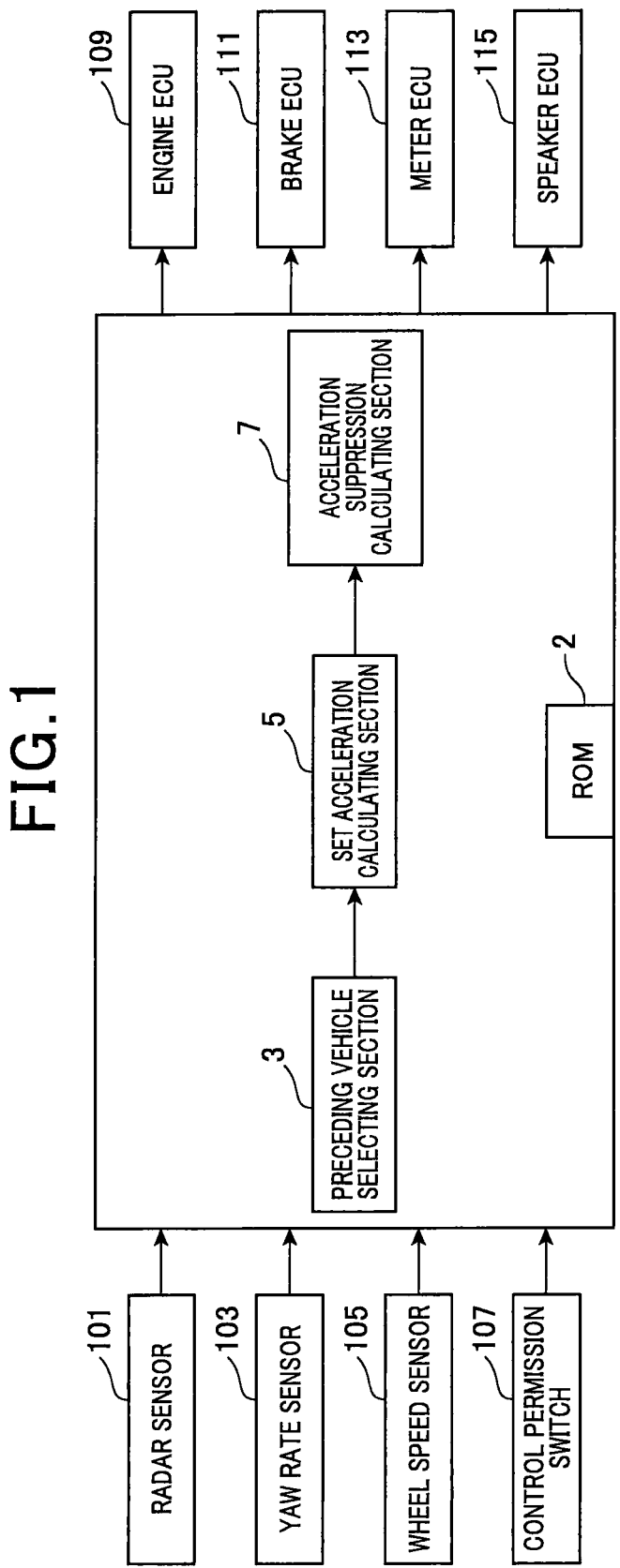
FIG. 1 is a block diagram showing the structure of a vehicle running control apparatus 1 according to an embodiment of the invention.

FIG. 1 is a block diagram showing the structure of a vehicle running control apparatus 1 according to an embodiment of the invention. The vehicle running control apparatus 1, which is mounted on a vehicle (the own vehicle, hereinafter) is mainly constituted of a microcomputer including a CPU, a RAM and a ROM 2. The ROM 2 stores program for performing later-described operations and processes.

The vehicle running control apparatus 1 includes a preceding vehicle selecting section 3, a set acceleration calculating section 5 and an acceleration suppression calculating section 7. The preceding vehicle selecting section 3 detects a preceding vehicle, and selects it as an object which the own vehicle should follow. The set acceleration calculating section 5 calculates a set acceleration depending on the own vehicle's circumstances. The acceleration suppression calculating section 7 performs a later-described acceleration suppressing operation when the preceding vehicle is lost.

The vehicle running control apparatus 1 receives signals outputted from a radar sensor 101, a yaw rate sensor 103, a wheel speed sensor 105 and a control permission switch 107. The radar sensor 101 scans the area within a predetermined angle range in front of the own vehicle by emitting radar waves. The radar sensor 101 calculates the distance from the own vehicle to an obstacle (which may be a preceding vehicle) based on the time period between the moment at which the radar waves were emitted and the moment at which a reflected version of the radar waves have been received. The radar sensor 101 also estimates the direction of the obstacle based on the direction of the reflected version of the radar waves.

The yaw rate sensor 103 detects the yaw rate of the own vehicle. The wheel speed sensor 105 detects the rotational speed of the wheels of the own vehicle, and calculates the speed of the own vehicle based on the detected rotational speed. The control permission switch 107, which is operable by the driver of the own vehicle, is for switching between set/reset of a later-described ACC (Auto Cruise Control) mode.

The vehicle running control apparatus 1 sends commands of the calculated acceleration and the state of control to an engine ECU 109, a brake ECU 111 and a meter ECU 113 mounted on the own vehicle. The engine ECU 109, brake ECU 111 and meter ECU 113 performs control to accelerate the own vehicle in accordance with the commands received from the vehicle running control apparatus 1. The vehicle running control apparatus 1 also controls a speaker 115 installed in the cabin of the own vehicle to sound an alarm as necessary.

The preceding vehicle selecting section 3 and the set acceleration calculating section 5 constitute a following distance control unit, the set acceleration calculating section 5 constitute an accelerating unit, the acceleration suppression calculating section 7 constitutes an acceleration suppressing unit, and the speaker 115 constitutes an informing unit.

Figure 2:
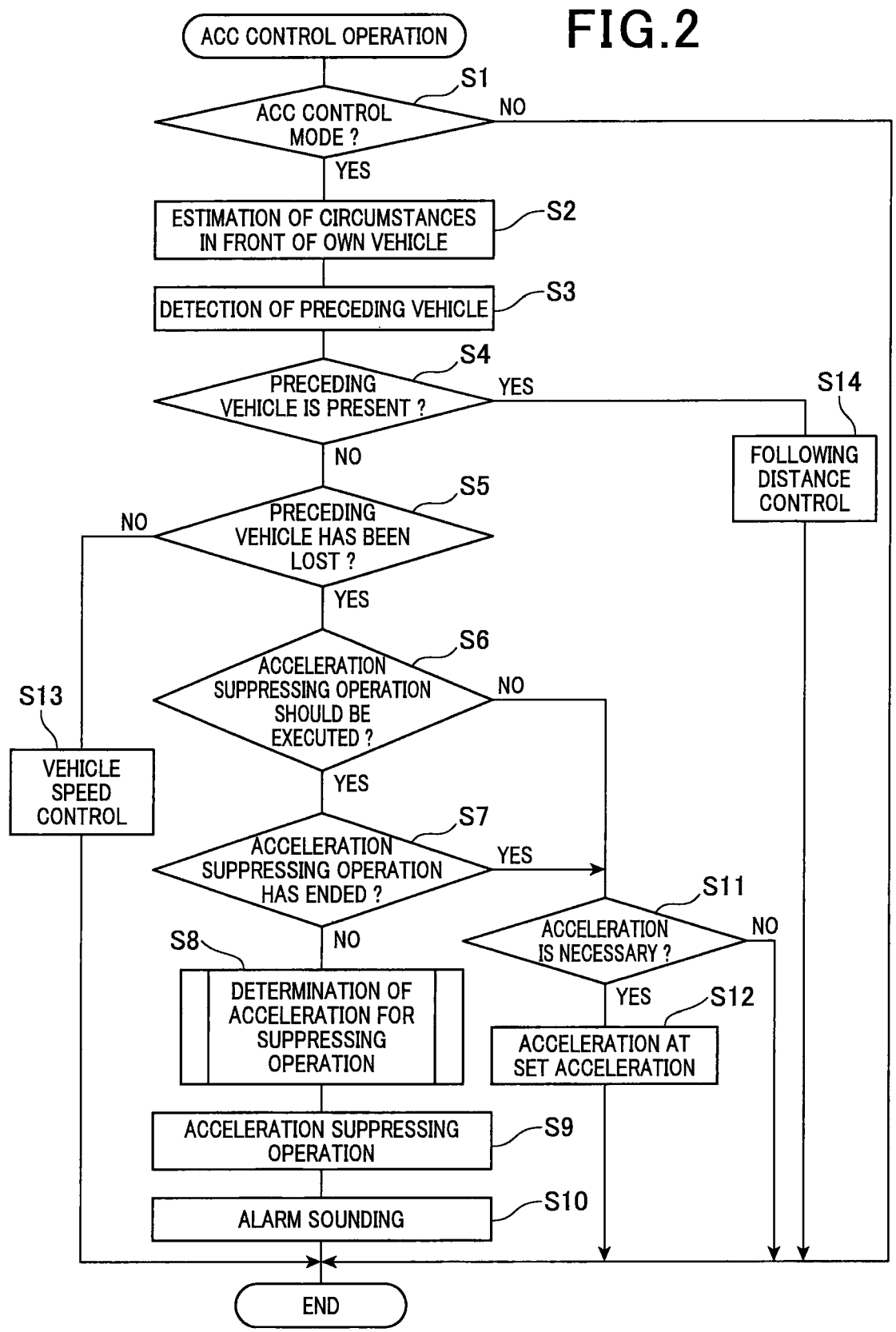
FIG. 2 is a flowchart showing steps of an ACC control operation performed by the vehicle running control apparatus 1.
Figure 3:
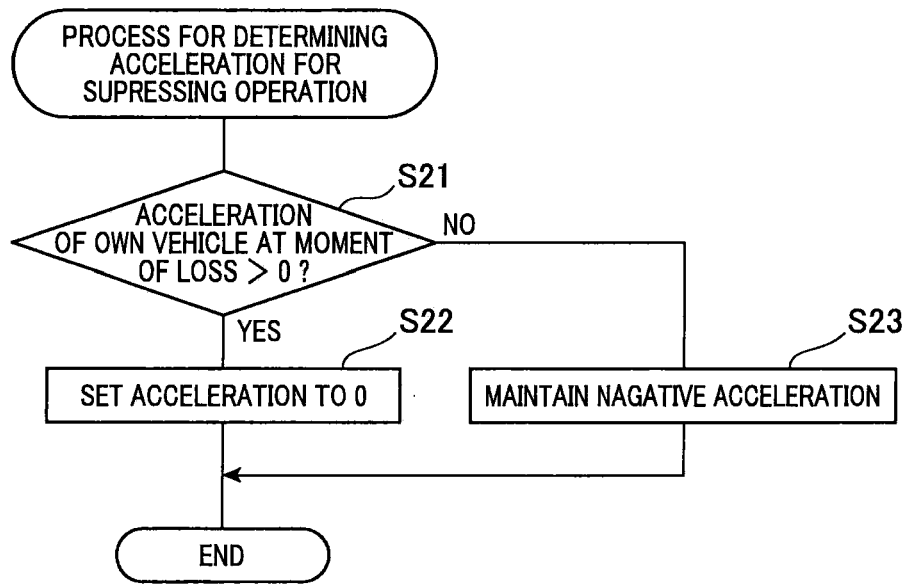
FIG. 3 is a flowchart showing a process for determining an acceleration at the time of performing an acceleration suppressing operation included in the running control operation.

The programs stored in the ROM 2 is for the microcomputer to operate as the following distance control unit, the accelerating unit, the acceleration suppressing unit and the informing unit. Next, the operations and processes performed by the vehicle running control apparatus 1 are explained with reference to FIGS. 2 to 6. FIG. 2 shows steps of a running control operation performed at regular time intervals by the vehicle running control apparatus 1. This operation begins in step S1 in which it is determined whether or not the ACC mode is in operation. If the determination result in step S1 is affirmative, the operation proceeds to step S2, and otherwise the operation is terminated.

The ACC mode is a mode where the own vehicle is controlled to run at a set speed while no preceding vehicle is detected, and while a preceding vehicle is detected, the own vehicle is controlled to follow the preceding vehicle maintaining a set following distance to the preceding vehicle. Further, when the preceding vehicle is lost, the own vehicle is accelerated at a set acceleration a until the speed of the own vehicle reaches the set speed excluding a time period during which a later-explained acceleration suppressing operation is performed.

The ACC mode can be implemented by performing the methods as described in Japanese Patent No. 3123430, Japanese Patent Application Laid-open No. 2002-19486, or Japanese Patent Application Laid-open No. 2003-267085, for example.

In step S2, the circumstances (road curvature radius, for example) of the road (or travel lane) in front of the own vehicle are estimated using the yaw rate sensor 103 and the wheel speed sensor 105. In subsequent step S3, a process to detect a preceding vehicle on the travel lane the circumstances of which have been estimated is performed.

In subsequent step S4, it is determined whether or not a preceding vehicle is present based on the results of the process performed in step S3. Specifically, if an object is detected to be present within a predetermined distance range and a predetermined direction range, this object is determined to be a preceding vehicle. If the determination result in step S4 is negative, the process proceeds to step S5, and otherwise proceeds to step S14.

In step S5, it is determined whether the disappearance of the preceding vehicle is normal disappearance, or abnormal disappearance, that is, loss of the preceding vehicle. When the preceding vehicle suddenly becomes unable to be detected, the disappearance is determined to be lost of the preceding vehicle, and otherwise determined to be normal disappearance. If the disappearance is determined to be lost, the process proceeds to step S6, and otherwise proceeds to step S13. In step S6, it is determined whether the conditions to perform the acceleration suppressing operation are satisfied. The conditions to perform the acceleration suppressing operation includes condition A and condition B. The condition A is satisfied when both the following conditions A1 and A2 are satisfied. Condition A1: The relative speed of the own vehicle relative to the preceding vehicle is 0 km/h at the moment of the loss (at the moment when the loss has occurred). Condition A2: D(0) and a0 satisfy the following equation 1, or D(0) is smaller than 20 m.

$$D(0) < \frac{1}{72}a_0^3 - \frac{7}{72}a_0^2 - \frac{47}{6}a_0 + \frac{15}{2} \qquad \text{Equation 1}$$

where D(0) is the following distance of the own vehicle to the preceding vehicle at the moment of the loss, and a0 is the acceleration of the own vehicle at the moment of the loss. The following distance D(0) can be calculated based on the detection result by the radar sensor 101. The acceleration $a_0$ can be calculated as a variation per unit time of the speed detected by the wheel speed sensor 105.

Figure 4:
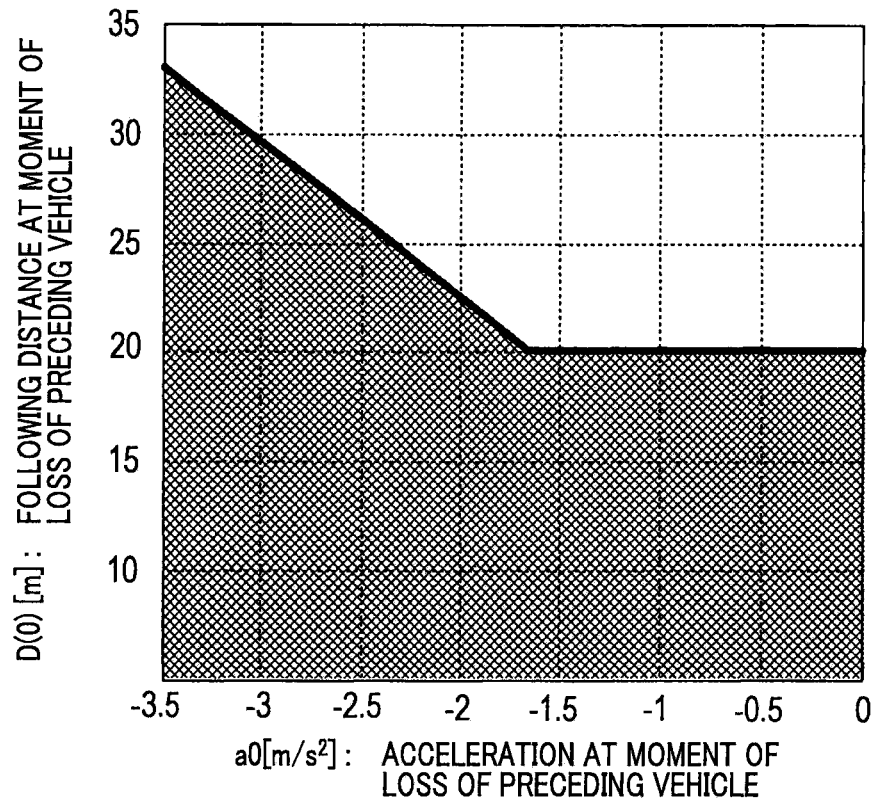
FIG. 4 is a diagram for explaining conditions where an allowance time t before collision is smaller than a predetermined lower limit.

In the graph of FIG. 4 in which the horizontal axis represents the acceleration $a_0$ and the vertical axis represents the following distance D(0), the hatched area is an area where both the conditions A1 and A2 are satisfied.

The above equation 1 represents that the condition A1 is satisfied and the own vehicle and the preceding vehicle are under a condition where an allowance time t is smaller than a predetermined lower limit, as explained in detail below. Generally, the following equation 2 holds at the moment of loss of a preceding vehicle.

$$\left(v_{slf}(0)t + \frac{1}{2}at^2 - \Delta x_{jerk}\right) - \left(v_{tgt}(0)t + \frac{1}{2}bt^2\right) - D(0) = 0 \qquad \text{Equation 2}$$

The parameters in the above equation 2 are as follows.

$v_{slf}(0)$: the speed of the own vehicle at the moment of the loss $v_{tgt}(0)$: the speed of the preceding vehicle at the moment of the loss t: the allowance time (the time to collision between the own vehicle and the preceding vehicle after the loss in an assumption that the own vehicle increases the speed from the moment of the loss at the set acceleration a.

a: the set acceleration (the acceleration at which the own vehicle is accelerated to reach the set speed after the loss) b: the acceleration of the preceding vehicle (which is assumed to be constant)

$\Delta X_{jerk}$: an amount of reduction of the running distance of the own vehicle due to jerk limit (the limit to suppress the acceleration of the own vehicle within a predetermined range);

TTC(0) (the time to collision) at the moment of the loss is given by the following equation 3.

$$TTC(0) = \frac{D(0)}{v_{slf}(0) - v_{tgt}(0)} \qquad \text{Equation 3}$$

By substituting equation 3 to equation 2, and solving the resultant secondary equation, the following equation 4 is obtained.

$$t = \frac{D(0)}{a-b}\left(\sqrt{\frac{1}{TTC(0)^2} + \frac{2(a-b)}{D(0)} + \frac{2(a-b)\Delta x_{jerk}}{D(0)^2}} - \frac{1}{TTC(0)}\right) \qquad \text{Equation 4}$$

The following Equation 5 shows that the allowance time t is lower than the predetermined lower limit.

$$t \leq \frac{D(0)}{a-b}\left(\sqrt{\frac{1}{TTC(0)^2} + \frac{2(a-b)}{D(0)} + \frac{2(a-b)\Delta x_{jerk}}{D(0)^2}} - \frac{1}{TTC(0)}\right) \quad \text{Equation 5}$$

By deforming equation 5, the following equation 6 is obtained.

$$D(0) < \frac{t^2 \cdot TTC(0) \cdot (a-b) - 2\Delta x_{jerk} \cdot TTC(0)}{2(TTC(0) - t)} \quad \text{Equation 6}$$

Figure 5:
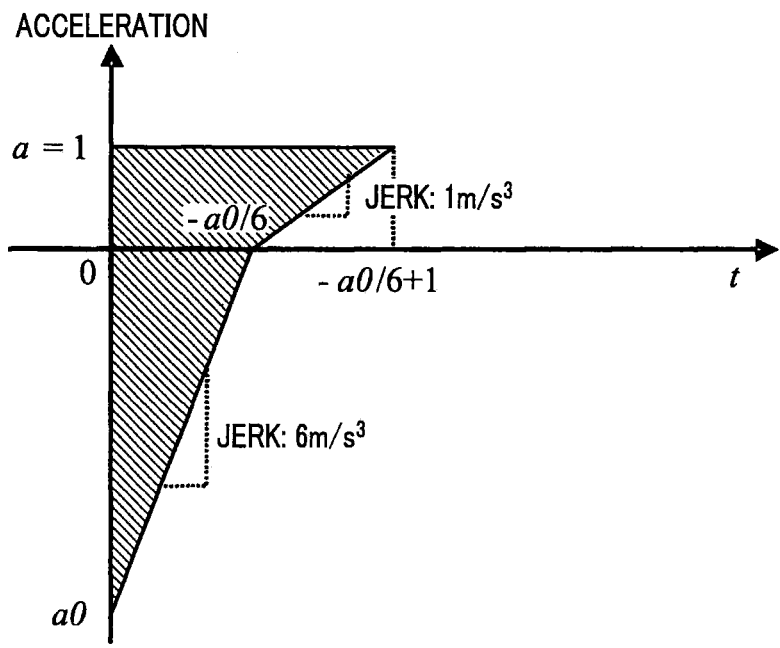
FIG. 5 is a diagram for explaining an amount of reduction of the running distance of an own vehicle due to jerk limit $\Delta x_{jerk}$ in the acceleration suppressing operation.

The $\Delta x_{jerk}$ as shown in FIG. 5 can be expressed by the following equation 7.

$$\Delta x_{jerk} = -\frac{1}{72}a_0^3 + \frac{7}{72}a_0^2 - \frac{1}{6}a_0 + \frac{1}{2} \quad \text{Equation 7}$$

Here, equation 7 is substituted into equation 6. When the condition A1 holds, the TTC(0) in equation 6 is infinite. It is assumed that the acceleration b of the preceding vehicle is equal to the acceleration $a_0$ of the own vehicle at the time of the loss, the set acceleration a is 1 (m/s), and the allowance time t is 4 (seconds).

In this assumption, the foregoing equation 1 is obtained. That is, equation 1 represents that the preceding vehicle and the own vehicle are under the condition where the allowance time t is smaller than the predetermined lower limit.

The condition B is satisfied when both the following conditions B1 and B2 are satisfied. B1: The relative speed of the own vehicle relative to the preceding vehicle (the speed of the own vehicle minus the speed of the preceding vehicle) is negative in value, and larger in absolute value than a predetermined threshold value. B2: The combination of the following distance D(0) and the time to collision TTC(0) satisfies the following equation 8, or the following distance D(0) is smaller than 20 m.

$$D(0) < \frac{8 \cdot TTC(0) - \left(-\frac{1}{72}a_0^3 + \frac{7}{72}a_0^2 - \frac{1}{6}a_0 + \frac{1}{2}\right) \cdot TTC(0)}{TTC(0) - 4} \quad \text{Equation 8}$$

The time to collision TTC(0) in equation 8 can be calculated by dividing the following distance D(0) by the relative speed of the own vehicle relative to the preceding vehicle at the moment of the loss. The relative speed can be calculated as the variation rate per unit time of the following distance which is continuously measured by the radar sensor 101.

Figure 6:
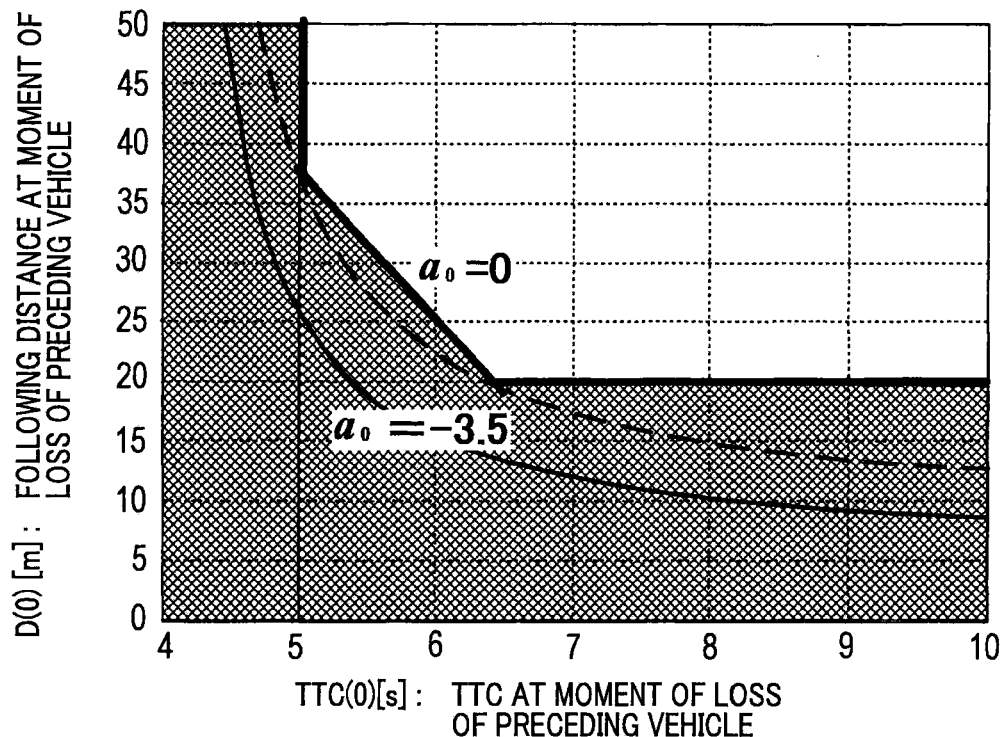
FIG. 6 is a diagram for explaining conditions where the allowance time t before collision is smaller than the predetermined lower limit.

In the graph of FIG. 6 in which the horizontal axis represents the TTC(0) and the vertical axis represents the following distance D(0), the hatched area is an area in which the preceding vehicle and the own vehicle at the moment of the loss are under the condition where both the conditions B1 and B2 are satisfied.

Equation 8 represents that the condition B1 is satisfied and the own vehicle and the preceding vehicle are under the condition where the allowance time t is smaller than the predetermined lower limit. This is explained in detail below.

It is assumed that the acceleration b of the preceding vehicle is 0, and the allowance time is 4. In this assumption, by substituting equation 7 into equation 6, equation 8 is obtained. As explained in the foregoing, equation 8 represents that the condition B1 is satisfied, and the own vehicle and the preceding vehicle are under the condition where the allowance time t is smaller than the predetermined lower limit.

Returning to FIG. 2, in step S6, it is determined whether the preceding vehicle and the own vehicle are under any of the conditions A and B at the moment of the loss. If the determination result in step S6 is affirmative, the operation proceeds to step S7, and otherwise proceeds to step S11.

In step S7, it is determined whether or not the acceleration suppressing operation has ended. The acceleration suppressing operation ends when any one of the following conditions is satisfied.

The own vehicle has reached the position of the preceding vehicle at the moment of the loss.

A predetermined time has elapsed after starting the acceleration suppressing operation.

A preceding vehicle has been detected to be present at a position closer to the own vehicle than the position of the lost preceding vehicle is.

The vehicle driver has pressed the accelerator pedal.

If the determination result in step S7 is negative, the operation proceeds to step S8, and otherwise proceeds to step S11. In step S8, the acceleration during the acceleration suppressing operation is determined. This determination process is explained with reference to the flowchart of FIG. 3. This process begins in step S21 where it is determined whether or not the acceleration of the own vehicle at the moment of the loss is greater than or equal to 0. If the determination result in step S21 is affirmative, the process proceeds to step S22 to set the acceleration during the acceleration suppressing operation to be 0. If the determination result in step S21 is negative, that is, if the acceleration of the own vehicle at the moment of the loss has a negative value and the own vehicle is decelerating, the process proceeds to step S23 to set the value of the acceleration during the acceleration suppressing operation to be equal to this negative value. Anyway, the acceleration determined in step S8 is smaller than the set acceleration a.

Returning to FIG. 2, in step S9, the acceleration suppressing operation is performed. That is, the acceleration of the own vehicle is set to the value determined in step S8. As described in the foregoing, the acceleration suppressing operation includes a case to maintain the negative acceleration (maintain the deceleration of the own vehicle).

In step S10, an alarm sounding is made for a certain time period using the speaker 115. On the other hand, if the determination result in step S7 is affirmative, the operation proceeds to step S11 to determine whether or not the own vehicle should be accelerated. Specifically, if the speed of the own vehicle is lower than the set speed at this moment, it is determined that the own vehicle should be accelerated, and the operation proceeds to step S12. On the other hand, if the speed of the own vehicle is greater than or equal to the set speed at this moment, the operation is terminated determining that it is not necessary to accelerate the own vehicle.

In step S12, the acceleration of the own vehicle is set to the set acceleration a so that the speed of the own vehicle reaches the set speed. If the determination result in step S5 is negative, the operation proceeds to step S13 to maintain the speed of the own vehicle at the set speed.

If the determination result in step S4 is affirmative, the operation proceeds to step S14 to control the acceleration of the own vehicle such that the following distance between the preceding vehicle and the own vehicle is maintained at the set following distance. The set following distance is the product of a set following time and the speed of the own vehicle. Further, the acceleration of the own vehicle is controlled such that the relative speed between the preceding vehicle and the own vehicle becomes zero as necessary.

The vehicle running control apparatus 1 described above provides the following advantages.

(1) When a preceding vehicle has been lost, the vehicle running control apparatus 1 performs the acceleration suppressing operation on condition that the preceding vehicle and the own vehicle are under the conditions that the allowance time t is smaller than the predetermined lower limit. This makes it possible to prevent the acceleration suppressing operation from being performed unnecessary.

(2) The vehicle running control apparatus 1 determines whether the acceleration suppressing operation should be performed or not using equations 1 and 8 which include a small number of parameters. This makes it possible to simplify the operations and processes to be performed by the vehicle running control apparatus 1.

(3) The vehicle running control apparatus 1 performs the acceleration suppressing operation if the following distance D(0) is smaller than a predetermined value. This can ease the tension of the vehicle driver when a preceding vehicle has been lost.

(4) The vehicle running control apparatus 1 sounds an alarm at the time of performing the acceleration suppressing operation. The vehicle running control apparatus 1 does not sound the alarm while the acceleration suppressing operation is not in operation. Accordingly, the vehicle driver can easily know that the acceleration suppressing operation is being carried out.

It is a matter of course that various modifications can be made to the above embodiment as described below.

(1) The conditions in which the allowance time t is smaller than the lower limit may be other than the conditions A and B. The vehicle running control apparatus 1 may be configured to determine whether the acceleration suppressing operation should be performed or not using only one of the conditions A and B.

(2) The conditions B1 and B2 may not include the condition that the following distance D(0) is smaller than 20 m. The condition A1 may be such that the relative speed of the own vehicle relative to the preceding vehicle is smaller in absolute value than a predetermined threshold speed instead of that the relative speed is zero.

(3) The acceleration set in step S22 may be in the range larger than 0 to the set acceleration a.

(4) The vehicle running control apparatus 1 may inform the vehicle driver of the acceleration suppressing operation being in operation using other than the speaker 115. For example, a lamp mounted on the own vehicle or a display device installed in the cabin of the own vehicle may be used for this purpose.

(5) The vehicle running control apparatus 1 may be configured to determine that the acceleration suppressing operation should be performed when the estimated time to collision TTC(0) is smaller than a predetermined time in addition to when both the conditions A and B are satisfied.

The above explained preferred embodiments are exemplary of the invention of the present application which is described solely by the claims appended below. It should be understood that modifications of the preferred embodiments may be made as would occur to one of skill in the art.

What is claimed is:

1. A vehicle running control apparatus comprising:
a following distance control unit maintaining a following distance between an own vehicle on which the vehicle running control apparatus is mounted and a preceding vehicle;
an accelerating unit accelerating the own vehicle at a set acceleration so that a speed of the own vehicle reaches a set speed when the preceding vehicle is lost; and
an acceleration suppressing unit configured to suppress acceleration of the own vehicle by the accelerating unit on condition that the preceding vehicle and the own vehicle are under an acceleration suppression condition when an allowance time to collision between the own vehicle and the preceding vehicle is smaller than a predetermine lower limit at a moment of a loss of the preceding vehicle; wherein
the allowance time is a time to collision between the own vehicle and the preceding vehicle after loss of the preceding vehicle using an assumption that acceleration of the own vehicle is not suppressed.

2. A vehicle running control apparatus comprising:
a following distance control unit maintaining a following distance between an own vehicle on which the vehicle running control apparatus is mounted and a preceding vehicle:
an accelerating unit accelerating the own vehicle at a set acceleration so that a speed of the own vehicle reaches a set speed when the preceding vehicle is lost; and
an acceleration suppressing unit configured to suppress acceleration of the own vehicle by the accelerating unit on condition that the preceding vehicle and the own vehicle are under an acceleration suppression condition when an allowance time to collision between the own vehicle and the preceding vehicle is smaller than a predetermine lower limit at a moment of a loss of the preceding vehicle; wherein
the acceleration suppression condition includes a condition A that a relative speed of the own vehicle relative to the preceding vehicle at the moment of the loss is lower than or equal to a predetermined threshold speed, and a combination of the following distance and the acceleration of the own vehicle at the moment of the loss satisfies the acceleration suppression condition.

3. A vehicle running control apparatus comprising:
a following distance control unit maintaining a following distance between an own vehicle on which the vehicle running control apparatus is mounted and a preceding vehicle:
an accelerating unit accelerating the own vehicle at a set acceleration so that a speed of the own vehicle reaches a set speed when the preceding vehicle is lost; and
an acceleration suppressing unit configured to suppress acceleration of the own vehicle by the accelerating unit on condition that the preceding vehicle and the own vehicle are under an acceleration suppression condition when an allowance time to collision between the own vehicle and the preceding vehicle is smaller than a predetermine lower limit at a moment of a loss of the preceding vehicle; wherein
the acceleration suppression condition includes a condition B that a value of a relative speed of the own vehicle relative to the preceding vehicle at the moment of the loss is negative and exceeds in absolute value a predetermined threshold value, and a combination of the following distance and an estimated time to collision at the moment of the loss satisfies the acceleration suppression condition.

4. The vehicle running control apparatus according to claim 1, wherein, when the acceleration of the own vehicle at the moment of the loss is greater than 0, the acceleration suppressing unit sets the acceleration of the own vehicle smaller than the set acceleration.

5. The vehicle running control apparatus according to claim 1, wherein, when the acceleration of the own vehicle at the moment of the loss has a negative value, the acceleration suppressing unit sets the acceleration of the own vehicle equal to the negative value.

6. The vehicle running control apparatus according to claim 1, wherein the acceleration suppressing unit suppresses acceleration of the own vehicle also when the following distance is smaller than a predetermined value.

7. The vehicle running control apparatus according to claim 1, wherein the acceleration suppressing unit suppresses acceleration of the own vehicle also when the estimated time to collision is smaller than a predetermined value.

8. The vehicle running control apparatus according to claim 1, further comprising an informing unit informing a vehicle driver that the acceleration suppressing unit is suppressing acceleration of the own vehicle.

9. A program recorded on a non-transitory medium enabling a computer to operate a vehicle running control apparatus, the vehicle running control apparatus comprising:

a following distance control unit maintaining a following distance between an own vehicle on which the vehicle running control apparatus is mounted and a preceding vehicle;

an accelerating unit accelerating the own vehicle at a set acceleration so that a speed of the own vehicle reaches a set speed when the preceding vehicle is lost; and an acceleration suppressing unit configured to suppress acceleration of the own vehicle by the accelerating unit on condition that the preceding vehicle and the own vehicle are under an acceleration suppression condition when an allowance time to collision between the own vehicle and the preceding vehicle is smaller than a predetermine lower limit at a moment of a loss of the preceding vehicle; wherein the allowance time is a time to collision between the own vehicle and the preceding vehicle after loss of the preceding vehicle using an assumption that acceleration of the own vehicle is not suppressed.

\* \* \* \* \*